United States Patent [19]

Lim et al.

[11] Patent Number: 5,284,559
[45] Date of Patent: Feb. 8, 1994

[54] PREPARATIVE ELECTROPHORESIS DEVICE AND METHOD

[75] Inventors: Yow-Pin Lim, Providence; Douglas C. Hixson, Barrington, both of R.I.

[73] Assignee: Rhode Island Hospital, Providence, R.I.

[21] Appl. No.: 899,460

[22] Filed: Jun. 16, 1992

[51] Int. Cl.$^5$ .................. G01N 27/26; G01N 27/447
[52] U.S. Cl. .............................. 204/182.8; 204/299 R
[58] Field of Search ........................ 204/299 R, 182.8

[56] References Cited

U.S. PATENT DOCUMENTS

| | | | |
|---|---|---|---|
| 3,533,933 | 10/1970 | Strauch | 204/182.8 |
| 3,697,406 | 10/1972 | Svendson | 204/182.8 |
| 4,111,785 | 9/1978 | Roskam | 204/182.8 |
| 4,707,233 | 11/1987 | Margolis | 204/299 R X |
| 4,877,510 | 10/1989 | Chen | 204/299 R |
| 5,039,386 | 8/1991 | Margolis | 204/299 R X |

FOREIGN PATENT DOCUMENTS

| | | | |
|---|---|---|---|
| 434985 | 7/1974 | U.S.S.R. | 204/299 R |
| 2177211A | 1/1987 | United Kingdom | |

OTHER PUBLICATIONS

Bio-Rad Model 491 Prep Cell Instruction Manual.
Applied Biosystmes Model 230A HPEC System, High Performance electrphoresis brochure.
Hoeffer, SE 6101 Preparative Electrophoresis Accessory Kit Instructions.
Novel Experimental Technology, "A Solid System . . . You Can Jump Right Into" brochure.
Cavinato, A. G., "An Non-Denaturing Gel Electrophoresis System for the Purification of Membrane Bound Proteins", *Preparative Biochemistry*, pp. 205-216 (1988).
Sheer, D. G., "The Use of Micropreparative Electrophoresis of Protein/Peptide Isolations for Primary Structure Determinations", *Product Application Focus*, vol. 9, No. 4, pp. 486-495 (1990).
Bio-Rad Mini-Protean (TM) II Dual Slab Cell Instruction Manual.
Bio-Rad Model 491 Prep Cell Continuous Elution Electrophoresis SDS-PAGE brochure.
Bio-Rad Model A Modular Electrophoresis System for SDS-PAGE, 2-D, Blotting, and Electro-Elution, "Every Mini is Fast. Only One is Versatile." brochure.
A. Lemay "Separation of the Two High Molecular Weight Spectrin Bands by a Newly Designed Preparative Slab Electrophoresis Technique" Analytical Biochemistry 92 (1979) 130-135.
Chrambach, "The Practice of Quantitative Gel Electrophoresis", *Advance Methods in the Biological Sciences*, Chapter 4, pp. 19-62 and Chapter 10, pp. 170-185 (1985).
Speicher, D. W., "Microsequencing with PVDF Membranes: Efficient Electroblotting, Direct Protein Adsorption and Sequencer Program Modifications", *Techniques in Protein Chemistry*, pp. 24-35.

(List continued on next page.)

*Primary Examiner*—John Niebling
*Assistant Examiner*—John S. Starsiak, Jr.
*Attorney, Agent, or Firm*—Fish & Richardson

[57] ABSTRACT

A preparative electrophoresis device having a pair of spaced apart plates, a pre-cast electrophoretic gel between the plates, and a semipermeable membrane sealably connected to ends of the plates to define with the plates a collection channel for receiving molecules that have traveled through the gel. Also disclosed are close spacing (less than 2.0 mm) of the plates, an inlet tube and an outlet tube connected to the two plates and communicating with opposite ends of the collection channel, an elongated divider between the plates to divide the gel into a purification region and an indicating region that is not as wide as the purification region and receives marker molecules of known molecular weight to indicate the location in the indicating region of molecules of interest, and pumping electrophoretic buffer into the collection channel at the same rate that it is pumped out.

45 Claims, 1 Drawing Sheet

OTHER PUBLICATIONS

Horuk, R., "Preparative Polyacrylamide Gel Electrophoresis of Proteins", *Advances in Electrophoresis*, vol. 1, pp. 362–379.

Carpenter, H. P. et al., "A Device for Preparative Elution Electrophoresis Using a Polyacrylamide Gel Slab", *Electrophoresis*, vol. 7, pp. 221–226 (1986).

Groschup, M. H., et al., "A Convenient Gel Holder for Preparative Electrophoretic Separation of Aggregated Bacterial Proteins", *Electrophoresis*, vol. 12, pp. 90–91 (1991).

Hjerten, S., "Apparatus for Large-Scale Preparative Polyacrylamide Gel Electrophoresis", *Analytical Biochemistry*, vol. 27, pp. 108–129 (1969).

Hunkapiller, M. W., "Isolation of Microgram Quantities of Proteins from Polyacrylamide Gels for Amino Acid Sequence Analysis", *Electroelution of Proteins from SDS Gels*, vol. 19 pp. 227–236 (1983).

Laemmli, U. K., "Cleavage of Structural Proteins during the Assembly of the Head of Bacteriophage T4", *Nature*, vol. 227, pp. 680–685 (1970).

Schagger, H., "Tricine-Sodium Dodecyl Sulfate-Polyacrylamide Gel Electrophoresis for the Separation of Proteins in the Range from 1 to 100 kDa", *Analytic Biochemistry 166*, pp. 368–379 (1987).

PREPARATIVE ELECTROPHORESIS DEVICE AND METHOD

BACKGROUND OF THE INVENTION

The invention relates to a preparative electrophoresis device and methods of using it.

Electrophoresis involves the use of an electric field to cause different charged molecules in a sample to migrate through a gel at different rates, resulting in separation of the different molecules. Separation is based on charge and/or size differences between different molecules. Molecules with higher charge migrate faster than molecules with lower charge, and lower molecular weight molecules migrate faster than the higher molecular weight molecules.

Because of the high resolving power of electrophoresis, it is widely used to separate proteins or peptides and polynucleotides, both as an analytical technique (in which molecules remain in the gel) and as a preparative tool (in which molecules are recovered). The gel can be cylindrical in a tubular chamber, or it can be flat in the form of a slab between two plates. Some commercially available analytical slab devices use disposable pre-poured gels with thicknesses ranging between 0.5 and 1.5 mm, and plates generally about 8 cm high and about 10 cm wide; these are generally known as "mini-gel" systems. Some larger analytical gels employ spacers 1.5 mm thick with plates generally about 15 cm high and 18 cm wide.

The molecules separated by electrophoresis can be recovered from the gel by slicing the gel or by electrophoretic transfer onto a membrane support. Further processing is usually required to remove the molecules from the gel or membrane support for further purification procedures. This preparative procedure is known as zone excision extraction.

The separated molecules can also be recovered by having them pass from the gel into a collection channel and flushing the channel with a buffer. Because different molecules enter the channel at different times they will be eluted separately. This preparative procedure is known as successive zone elution and requires the use of a special gel construction to provide a collection channel. These systems are typically of the tube gel type, and often employ a cooling system to dissipate the heat that is generated and can otherwise affect electrophoresis owing to increased temperature. The Model 491 system available from Bio-Rad Laboratories is an example of such a system. Chen U.S. Pat. No. 4,877,510 describes a cylindrical electrophoretic column that has a chamber defined by a porous plate and a semi-permeable membrane thereunder for receiving and removing molecules from the bottom of the column; electrophoretic buffer passes through the membrane into the porous plate and carries the molecules with it when it is pumped out.

Slab systems have also been used for successive zone elution preparative electrophoresis. Carpenter, H. P. et al., "A Device for Preparative Elution Electrophoresis Using a Polyacrylamide Gel Slab", *Electrophoresis*, Vol. 7, pp. 221–226 (1986) describes a device that is clipped on to the end of a 3 mm thick polyacrylamide slab gel and employs two paper membranes impregnated with polyacrylamide and separated by a 0.5 mm gap. The top membrane has 4% polyacrylamide, and the lower one has 25% polyacrylamide, permitting proteins of $M_r$ 10,000 to 1,000,000, to pass through the top membrane to the space between them, but to not pass through the lower membrane. Electrode buffer passes through the chamber to remove molecules migrating from the bottom of the gel into the compartment. This device is also described in UK Published Patent Application No. 2177211A and U.S. Pat. No. 4,707,233. Groschup, M. H., et al., "A Convenient Gel Holder for Preparative Electrophoretic Separation of Aggregated Bacterial Proteins", *Electrophoresis*. Vol. 12, pp. 90–91 (1991) describes a slab electrophoresis device having a transverse horizontal channel formed in the middle of the gel to collect proteins; inlet and outlet tubes are connected to the channel via threaded fittings.

SUMMARY OF THE INVENTION

In one aspect the invention features a preparative electrophoresis device having a pair of spaced apart plates, an electrophoretic gel between the plates, and a semipermeable membrane sealably connected to ends of the plates to define a collection channel for receiving molecules that have traveled through the gel from the sample-receiving region. The membrane defines an integral flow path for electrophoretic buffer and permits the entire length of the gel to be used for separation.

In another aspect the invention features a preparative electrophoretic device having a pair of plates that are spaced by less than 2 mm (most preferably less than about 1.5 mm), an electrophoretic gel between the plates, and a collection channel for receiving molecules that have traveled through the gel. The mini-gel format provides good heat dissipation, thereby permitting successive zone elution electrophoresis to be conducted at high voltage, thereby promoting resolution and quick processing. The mini-gel format spacing also permits the use of small samples and high protein to gel ratios.

In another aspect the invention features a preparative electrophoresis device having a pair of spaced apart plates, an electrophoretic gel between the plates, a collection channel for receiving molecules that have traveled through the gel, and an inlet tube and an outlet tube connected to the two plates and communicating with opposite ends of the collection channel. The device is constructed as a simple, inexpensive disposable unit that can be used for successive zone elution electrophoresis in commercially available vertical slab systems, and the integral connection of the tubes to the plates facilitates setup and permits easy, direct attachment to a peristaltic pump.

In another aspect the invention features a preparative electrophoresis device having a pair of spaced apart plates, an electrophoretic gel between the plates, and an elongated divider between plates to divide the gel into a purification region and an indicating region that is not as wide as the purification region. A sample-receiving region and a collection channel are aligned with and communicate with the purification region. A marker-receiving region is aligned with and communicates with the indicating region. The collection channel does not communicate with the indicating channel. Samples of molecules to be separated are placed in the sample receiving region and travel through the purification region to the collection channel. Marker molecules of known molecular weight are placed in the marker receiving region and provide a visual indication of their location and indicate the location of molecules of similar molecular weight in the purification region. This permits one to accurately decide when to begin collecting samples from buffer flowing through the collection channel and to vary the flow rate for this buffer as a function of the rate of migration.

In another aspect the invention features pumping electrophoretic buffer into a collection channel bounded by a semipermeable membrane at the same rate that it is pumped out (e.g., by use of a dual-channel pump). This avoids creating a transmembrane pressure that might collapse or damage the membrane or cause possible loss of molecules through pin holes or other leaks in the membrane.

In preferred embodiments, the gel in the purification channel ends short of the ends of the plates, and the collection channel is between the plates. The membrane wraps around the ends of the plates and is attached to outside surfaces of the plates. Spacers are provided between the plates on both sides of the gel. The inlet and outlet tubes have portions that are located between the plates and alongside respective spacers. A sealing gel is located between the bottoms of the spacers and the membrane to seal off the ends of the collection channel. The end of one plate extends beyond the end of the other plate at the sample and marker receiving regions.

The device can be advantageously used as a preparative tool to separate proteins, peptides, nucleic acids (DNA and RNA) and other molecules, and can be used in conjunction with a variety of techniques and procedures, as is described in more detail below. The gel unit design may be advantageously manufactured and delivered as a disposable, universal precast ready gel (able to be used with a variety of electrophoresis units) to greatly simplify the procedure and insure repeatable performance.

Other features and advantages of the invention will be apparent from the following description of the preferred embodiment thereof and from the claims.

DESCRIPTION OF THE PREFERRED EMBODIMENT

The preferred embodiment will now be described.

Drawings

Structure

Figure 1:
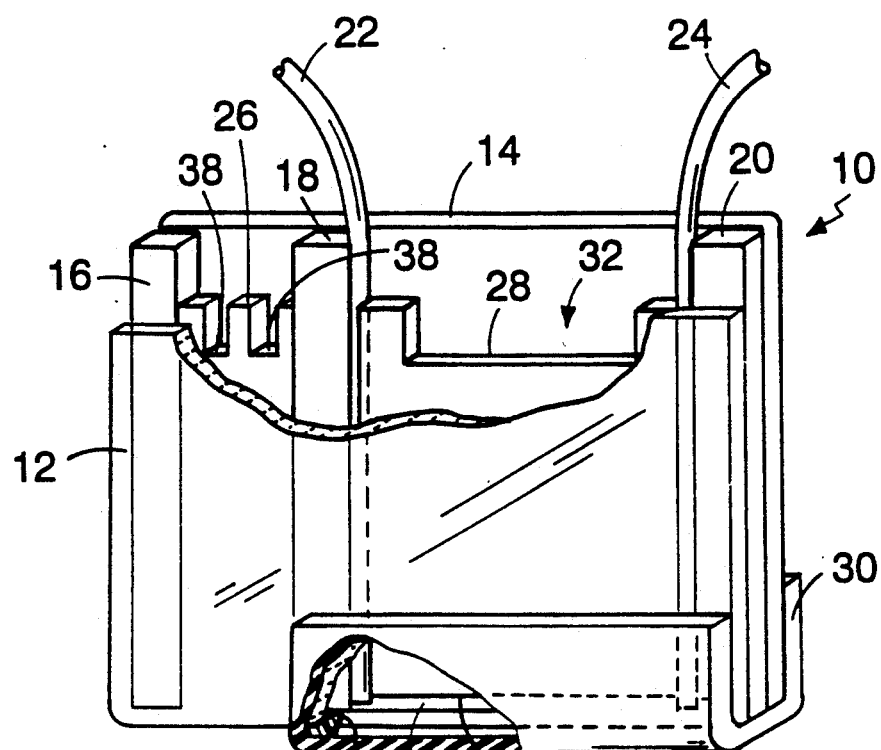
FIG. 1 is a diagrammatic perspective view, partially broken away, of a preparative electrophoresis device according to the invention.
Figure 2:
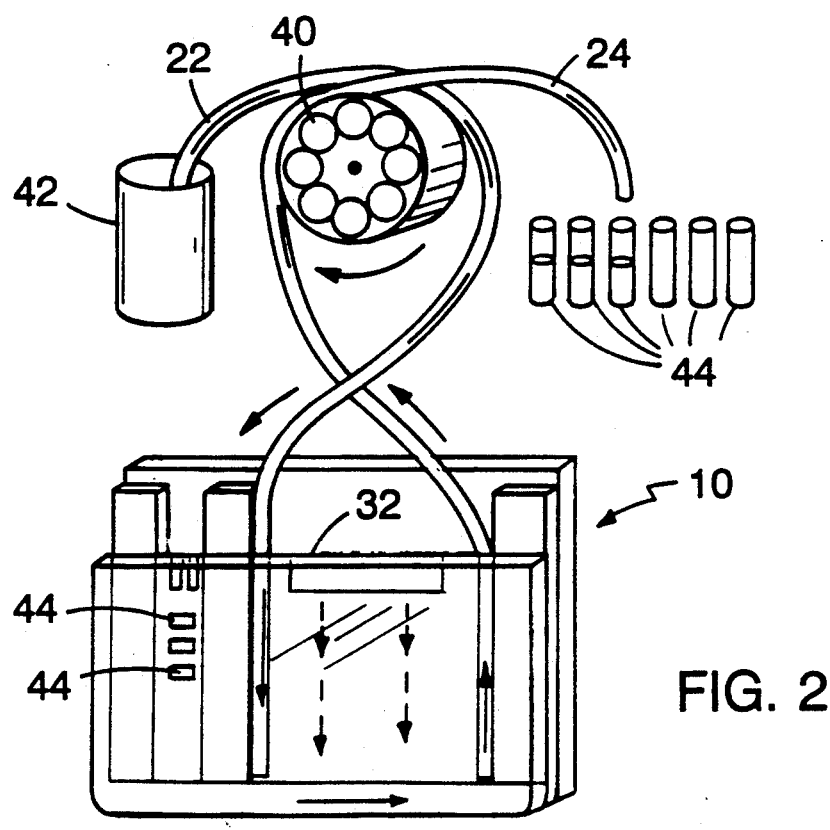
FIG. 2 is a diagram snowing use of the FIG. 1 device to collect fractionated samples separated in the FIG. 1 device.

Referring to FIG. 1, there is shown preparative electrophoresis device 10 in the mini-gel format. It includes front glass plate 12, back glass plate 14, three 1.0 mm thick Teflon spacers 16, 18, 20, inlet tube 22, outlet tube 24, gel 26 between spacers 16, 18, gel 28 between spacers 18, 20, and semi-permeable membrane 30. Tubes 22, 24 (available from Becton Dickinson under the Intramedic trade designation) have 1.27 mm outer diameters and are glued in place on the inner edges of spacers 18, 20.

Device 10 can be used with a modular mini-gel electrophoresis system available from Bio-Rad Laboratories, Richmond, Calif., under the Mini-Protean II Cell trade designation. Plates 12, 14 (7.3 cm by 10.2 cm and 8.3 cm by 10.2 cm; respectively) and spacers 16–20 are available from the same source under the 165-2907, 165-2908, and 165-932 trade designations, and are clamped together with a clamp assembly (not shown) available under the 165-2946 trade designation from the same source.

Gels 26, 28 include 10% T, 3% C acrylamide resolving gel and 3% T, 3% C acrylamide stacking gel. Semipermeable membrane 30, for example, is a dialysis membrane having a molecular weight cut off of 6,000 and is made from a split section of a molecular porous membrane tubing available from Spectrum Medical Industries under the Spectrapor (MWCO 6,000) trade designation.

Gel 28 in the region between spacers 18, 20, about 6 cm wide, is used for purification. It has a well 32 that provides a sample receiving region to receive the samples of interest. Bottom edge 34 of gel 28 is above the bottom edges of plates 12, 14 and defines, with the plates and membrane 30, collection channel 36 for receiving molecules that have traveled through gel 28 from the sample receiving region at well 32. Inlet tube 22 has an end that communicates with one end of collection channel 36, and outlet tube 24 has an end that communicates with the other end of collection channel 36. Any spaces between the bottoms of spacers 18 and 20 and membrane 30 are filled with a thin-film of suitable sealant 46 (e.g., grease available from Fisher Scientific under the Cello-Seal trade designation or latex sealant) to assure fluid-tight seals at the two ends of collection channel 36. Membrane 30 is adhered to the outside surfaces of plates 12 and 14 via tape (e.g., electrical tape available from 3M under the Scotch trade designation) or suitable adhesive.

Gel 26 is about 2 cm wide and has well 38 for receiving marker molecules (prestained standard proteins) that provide a visual indication of their location during travel through gel 26.

In making device 10, tubes 22, 24 are glued to spacers 18, 20; spacers 16, 18, and 20 are placed into position between plates 12, 14, and these components are clamped together. The resolving gel and stacking gel are then provided between the plates. After polymerization has occurred, the plates are carefully removed from the clamp, and sealant 46 is added to the bottom of spacers 18 and 20. Membrane 30 is then wrapped around the bottom of the plates and adhered to the outer surfaces of plates 12 and 14 only in the purification region, and the unit is placed back in the clamp. In the process of polymerizing, the lower edge of the gel moves upward away from the bottom edges of the plates a sufficient distance to provide collection channel 36.

Device 10 can advantageously be prepared and distributed as a disposable universal precast ready gel able to be used with a variety of mini-gel electrophoresis units from different manufacturers. This greatly simplifies the laboratory procedure and provides consistent results.

Operation

Device 10 is used with the modular electrophoresis unit described above, using the electrophoretic buffer described in Laemmli, U.K., "Cleavage of Structural Proteins during the Assembly of the Head of Bacteriophage T4", *Nature*, Vol. 2707, pp. 680–685 (1970)) in both electrode chambers and in source 42. Alternately, the tris-tricine buffer system described in Shaegger H., and von Jagow, G., "Tricine-Sodium Dodecyl Sulfate-Polyacrylamide Gel Electrophoresis for the Separation of Proteins in the Range from 1 to 100 Kda", *Anal. Biochem.*, Vol. 166, pp. 368–379 (1987) can be used; in this case the buffer of source 42 is the same as the buffer in the lower chamber.

Inlet tube 22 and outlet tube 24 are connected in reverse orientation to separate channels of a dual-channel peristaltic pump 40 (e.g., available under the Buchler Duostaltic Pump trade designation from Searle). Inlet tube 22 is connected to source of preparative electrophoresis buffer 42, and outlet tube 24 is positioned to provide samples in sequence to collection tubes 44 at the proper time. The sample of molecules to be separated is placed in sample receiving well 32, and the prestained standard proteins are placed in marker receiving wells 38.

Device 10 is placed in the electrophoresis unit, and electrophoresis is carried out at a constant voltage, e.g., 225 V to 250 V. The movement of markers 44 (prestained standard proteins) in the indicating region in gel 26 is monitored. Elution is initiated when the lower end of the molecular weight range of interest (as determined by markers 44) has reached the bottom of the indicating gel 26. Buffer is pumped by pump 40 from source 42 through tube 22 into collection channel 36 and from collection channel 36 through outlet tube 24 into a collection tube 44. The flow of buffer can be maintained at a constant rate or it can be varied to reflect a change in the rate of migration of proteins as observed by monitoring markers 44 in gel 26. By having buffer pumped in and out of collection channel 36 at equal rates, positive or negative pressure gradients that might tend to produce leaks, collapse the membrane or restrict the flow of buffer are eliminated.

The use of a high voltage provides increased resolution and fast separation time. This is possible because the large surface area and relatively short run time provided by the slab mini-gel format provide better heat dissipation as compared to tube gel or large slab-gel systems. Also, the close spacing of the plates offers a higher protein-to-gel ratio then large-slab gels or thick-tube gels but has comparable resolving power, making device 10 ideal for fast, high efficiency recovery of proteins.

The different fractions sequentially collected in collection tubes 44 can be subjected to further processing and analysis, depending upon the particular procedure being employed.

Outlet tube 24 can be passed through a UV monitor (not shown) to identify protein peaks. Alternatively, proteins present in aliquots taken from each fraction can be identified by sodium dodecyl sulfate-polyacrylamide gel electrophoresis analysis. If proteins of interest have been radiolabeled prior to purification, elution profiles can be determined by assessing the amount of radioactivity in a beta or gamma counter. Applied in this manner, for example, the system provides an easy and convenient method for removal of antibodies (IgG or IgM) which co-elute with protein antigens during preparative immunoprecipitation on immobilized protein A/G or IgM binding proteins.

Electrophoresis could also be carried out under nondenaturing conditions thereby providing a means for the purification of proteins in their native configuration.

Also, instead of acrylamide, agarose gels can be used, thereby providing a comparable preparative electrophoresis system in the mini-gel format to isolate and fractionate DNA or RNA or purify synthetic oligonucleotides.

Because device 10 permits high recovery of small amounts, it can be used in preparative electrophoresis in micro-scale (1-300 µg) quantities, useful for protein peptide sequencing analysis. This separation method is less expensive than high-performance liquid chromatography and less labor-intensive and higher in resolution then gel permeation or ion exchange chromatography.

Other Embodiments

Other embodiments of the invention are within the scope of the appended claims. E.g., other size spacers (e.g., 0.5 mm. 0.75 mm, 1.0 mm, 1.25 mm, 1.5 mm, and 2.0 mm are acceptable) and different size tubes can be employed. Preferably the spacers are between about 0.5 mm and 2.0 mm, and most preferably between about 1.0 mm and 1.5 mm, the latter range providing a good balance between reducing the spacing to increase heat dissipation and to achieve the other advantages mentioned above and providing sufficient space for a desired sample volume in well 28. Preferably the plates are less than 10 cm high and 12 cm wide (most preferably about 8 cm high and 10 cm wide). Molecules of interest in the sample can be labelled by any means including e.g., radiolabeling or fluorescent labeling. Also, device 10 can be used with other methods and techniques beyond those mentioned above.

What is claimed is:

1. A preparative electrophoresis device comprising
    a pair of spaced apart plates having a sample-receiving region and a gel region therebetween, said sample-receiving region being near first ends of said plates, said plates having second ends on the opposite side of said gel region from said first ends,
    an electrophoretic gel in said gel region between said plates, said gel ending short of said second ends and having a gel bottom surface, and
    a semipermeable membrane sealably connected to said second ends, said membrane being wrapped around said second ends and attached to outside surfaces of said plates,
    said semipermeable membrane defining with said plates and said gel bottom surface a collection channel between said plates and along said second ends of said plates for receiving molecules traveling through said gel from said sample-receiving region.

2. The device of claim 1 wherein said plates are spaced less than 2 mm apart.

3. The device of claim 2 wherein said plates are spaced apart between about 1.0 mm and 1.5 mm.

4. A preparative electrophoresis device comprising
    a pair of spaced apart plates having a sample-receiving region and a gel region therebetween, said sample-receiving region being near first ends of said plates, said plates having second ends on the opposite side of said gel region from said first ends,
    an electrophoretic gel in said gel region between said plates, said gel having a gel bottom surface,
    spacers provided between said plates on both sides of said gel,
    a semipermeable membrane sealably connected to said second ends and defining with said plates and said gel bottom surface a collection channel along said second ends of said plates for receiving molecules traveling through said gel from said sample-receiving region,
    an inlet tube connected to said plates and communicating with one end of said collection channel, and an outlet tube connected to said plates and communicating with the other end of said collection channel.

5. The device of claim 4 wherein said tubes have portions located between said plates that extend from said collection channel to said first ends alongside respective spacers and have portions extending beyond said plates.

6. The device of claim 5 further comprising an elongated divider that is located between said two plates and divides said gel region into a purification region and an indicating region, said purification region being wider than said indicating region, said sample-receiving region and said collection channel being aligned with and communicating with said purification region, said device also having a marker-receiving region between said plates and aligned with and communicating with said indicating region at said first ends.

7. The device of claim 6 wherein said divider is a spacer between said plates, and further comprising sealing gels between the ends of said spacers on both sides of said purification channel and said membrane at said second end to seal off the ends of said collection channel.

8. The device of claim 6 wherein said plates are spaced between about 1 mm and 1.5 mm apart.

9. The device of claim 5 wherein said plates are spaced less than 2 mm apart.

10. The device of claim 1 wherein one said first end extends beyond the other said first end.

11. The device of claim 5 further comprising a pump connected to pump into said inlet tube at the same rate that it pumps out of said outlet tube.

12. The device of claim 11 wherein said pump is a peristaltic pump having a rotor, and both said tubes are connected to the same rotor in opposite orientation.

13. A preparative electrophoresis device comprising
a pair of spaced apart plates having a sample-receiving region and a gel region therebetween, said sample-receiving region being near first ends of said plates, said plates having second ends on the opposite side of said gel region from said first ends,
an electrophoretic gel in said gel region between said plates, said gel having a gel bottom surface,
a semipermeable membrane sealably connected to said second ends and defining with said plates and said gel bottom surface a collection channel along said second ends of said plates for receiving molecules traveling through said gel from said sample-receiving region, and
an elongated divider that is located between said two plates and divides said gel region into a purification region and an indicating region, said purification region being wider than said indicating region, said sample-receiving region and said collection channel being aligned with and communicating with said purification region, said device also having a marker-receiving region between said plates and aligned with and communicating with said indicating region at said first ends.

14. The device of claim 13 wherein said divider is a spacer between said plates, and further comprising a sealing gel between an end of said spacer and said membrane at said second end to seal off an end of said collection channel.

15. A preparative electrophoresis device comprising
a pair of spaced apart plates having a sample-receiving region, a marker-receiving region, and a gel region therebetween, said sample-receiving region and marker-receiving region being near first ends of said plates, said plates having second ends on the opposite side of said gel region from said first ends,
an electrophoretic gel in said gel region between said plates, said gel having a gel bottom surface,
an elongated divider located between said two plates, said divider extending at the junction of said sample-receiving region and said marker-receiving region from said first ends towards said second ends, said divider dividing said gel region into a purification region and an indicating region, said purification region being wider than said indicating region, and
a barrier sealably connected to said plates and said divider and located on the same side of said divider as said purification region, said barrier defining with said plates and said gel bottom surface a collection channel for receiving molecules traveling through said gel from said sample-receiving region.

16. The device of claim 15 wherein said divider is a spacer between said plates, and further comprising two additional spacers between said plates and extending from said receiving regions toward said second ends, one said spacer being on one side of said purification region, the other said spacer being on the other side of said indicating region.

17. The device of claim 16 further comprising
an inlet tube connected to said plates and communicating with one end of said collection channel, and
an outlet tube connected to said plates and communicating with the other end of said collection channel.

18. The device of claim 17 wherein said tubes have portions located between said plates that extend from said collection channel to said first ends alongside respective spacers and have portions extending beyond said plates.

19. The device of claim 15 wherein said plates are spaced less than 2 mm apart.

20. The device of claim 19 wherein said plates are spaced between about 1 mm and 1.5 mm apart.

21. The device of claim 15 wherein said plates are spaced less than 2 mm apart.

22. The device of claim 21 wherein said plates are spaced between about 1 mm and 1.5 mm apart.

23. A preparative electrophoresis device comprising
a pair of spaced apart plates having a sample-receiving region and a gel region therebetween, said sample-receiving region being near adjacent first ends of said plates, said plates having second ends on the opposite side of said gel region from said first ends,
an electrophoretic gel in said gel region between said plates, said gel having a gel bottom surface,
a barrier sealably connected to said second ends and defining with said plates and said gel bottom surface a collection channel for receiving molecules traveling through said gel from said sample-receiving region,
an inlet tube permanently connected to said plates and communicating with one end of said collection channel, and
an outlet tube permanently connected to said plates and communicating with the other end of said collection channel.

24. The device of claim 23 wherein said tubes have portions located between said pates that extend from said collection channel to said first ends and have portions extending beyond said plates.

25. The device of claim 24 further comprising spacers between said plates and extending from said sample receiving region toward said second ends, said sample receiving region and at least some of said gel being between said spacers.

26. A preparative electrophoresis method comprising
providing a preparative electrophoresis device having two spaced apart plates, an electrophoresis gel therebetween, a sample-receiving region on one side of said gel, and a collection channel on the other side of said gel, said collection channel being partially defined by a semipermeable membrane, said plates being spaced apart by about 2.0 mm or less, said gel having a purification region that communicates with said sample-receiving region and an indicating region that has a marker-receiving region communicating with it on the same side of said gel as said sample-receiving region,
placing a sample of molecules to be separated in said sample-receiving region,
providing a marker in said sample-receiving region adjacent said indicating region, said marker comprising marker molecules of known molecular weight that provide a visual indication of the location of said marker molecules during travel from said marker receiving region toward the other end of the plates, thereby providing an indication of molecules of a similar molecular weight in said sample during travel from said sample receiving region toward said collection channel,
applying a first voltage between said sample-receiving region and said collection channel so as to cause travel of said molecules through said gel from said sample-receiving region to said collection channel, different molecules traveling at different rates,
supplying an electrophoretic buffer to said collection channel, and
removing said electrophoretic buffer from said collection channel at the same flow rate as said supplying, said electrophoretic buffer being removed from said channel carrying molecules that have traveled through said gel into said collection channel.

27. The method of claim 26 further comprising sequentially collecting samples of said buffer removed from said channel in different vessels.

28. The method of claim 27 further comprising identifying molecules present in said different vessels by gel electrophoresis analysis.

29. The method of claim wherein said analysis is sodium dodecyl sulfate-polyacrylamide gel electrophoresis analysis.

30. The method of claim 27 further comprising recovering molecules present in said different vessels.

31. The method of claim 27 wherein said molecules in said sample include antigens and antibodies in solution, and wherein said antigens are separated from said antibodies in said vessels.

32. The method of claim 27 wherein the molecules in the said sample include a mixture of proteins in solution and wherein one or more proteins are separated from the others in said vessels.

33. The method of claim 26 further comprising passing the buffer removed from said channel through an ultraviolet monitor.

34. The method of claim 26 further comprising labeling of molecules of interest prior to placing in said sample-receiving region.

35. The method of claim 34 wherein said labeling is fluorescent labeling or radiolabeling of said molecules.

36. The method of claim 26 wherein said molecules include peptides.

37. The method of claim 26 wherein said molecules include peptides that have been labelled, and further comprising identifying peptides in said buffer removed from said channel.

38. The method of claim 37 wherein said peptides are low molecular weight peptides that have molecular weights in the range 1 to 60 Kda and have been produced by proteolytic or chemical digestion, and wherein said peptides have been labelled.

39. The method of 26 wherein said molecules are nucleic acids.

40. The method of 39 wherein said molecules are DNA.

41. The method of 39 wherein said molecules are RNA.

42. The method of 26 wherein said molecules are synthetic oligonucleotides.

43. The method of claim 26 wherein said molecules are proteins.

44. The method of claim 26 further comprising recovering separated molecules in said buffer removed from said channel in purified form.

45. The method of claim 26 wherein said plates are spaced by between about 1.0 mm and 1.5 mm.

* * * * *

UNITED STATES PATENT AND TRADEMARK OFFICE
CERTIFICATE OF CORRECTION

PATENT NO. : 5,284,559

DATED : February 8, 1994

INVENTOR(S) : Yow-Pin Lim et al.

It is certified that error appears in the above-identified patent and that said Letters Patent is hereby corrected as shown below:

On the title page: Item [56] Reference Cited:

In the References Cited, OTHER PUBLICATIONS section, the second publication should read --Biosystems--, not "Biosystmes".

Col. 3, line 46, "snowing" should be --showing--.

Col. 3, line 67, "165-932" should be --165-2932--.

Col. 10, claim 29, line 4, after "claim", insert --28--.

Signed and Sealed this

Seventh Day of January, 1997

Attest:

BRUCE LEHMAN

Attesting Officer

Commissioner of Patents and Trademarks